G. F. KNOWLES.
TRUCK.
APPLICATION FILED JUNE 30, 1919.
1,406,462.
Patented Feb. 14, 1922.
5 SHEETS—SHEET 1.
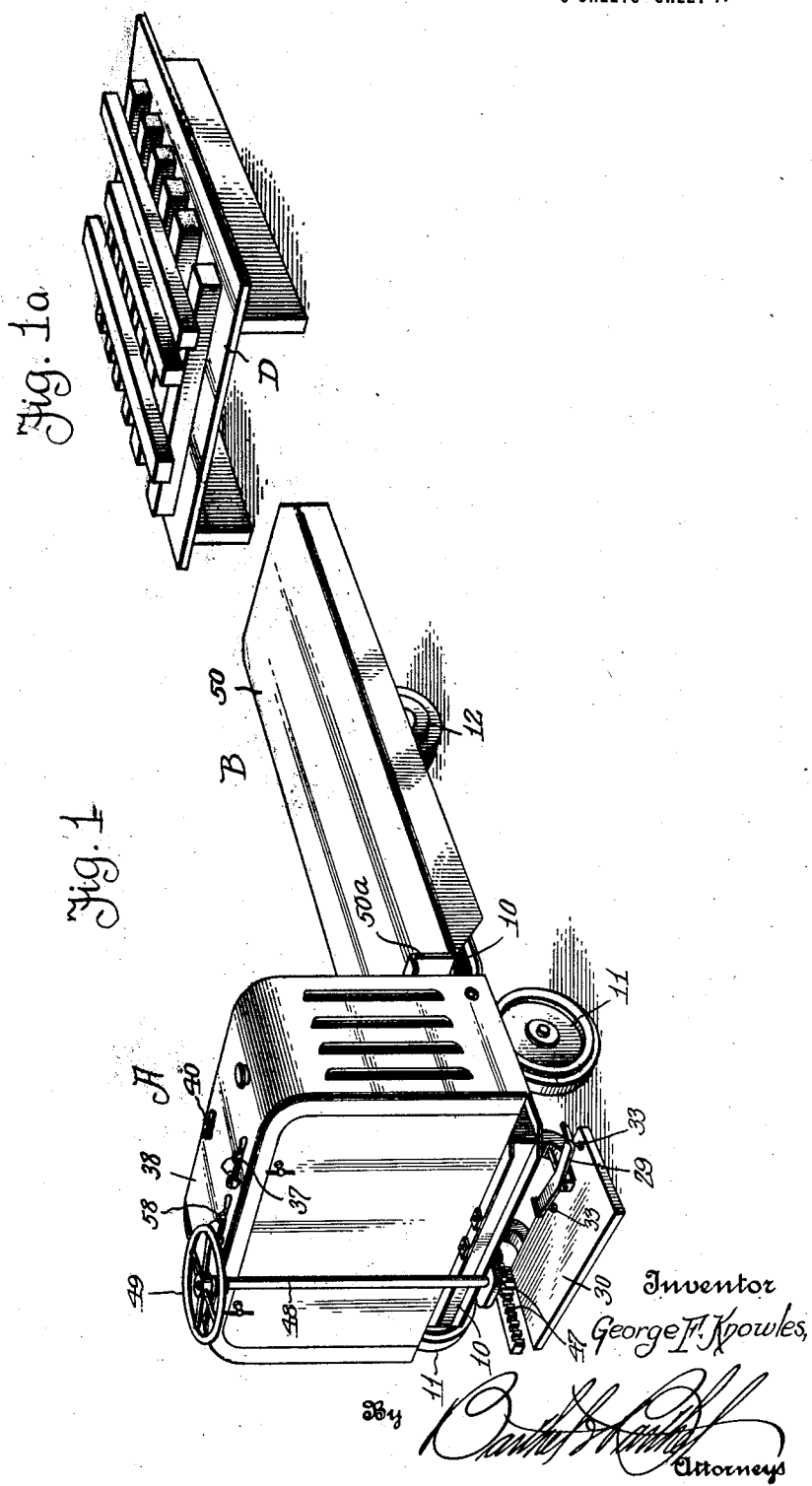

G. F. KNOWLES.
TRUCK.
APPLICATION FILED JUNE 30, 1919.

1,406,462.

Patented Feb. 14, 1922.
5 SHEETS—SHEET 2.

Inventor
George F. Knowles,

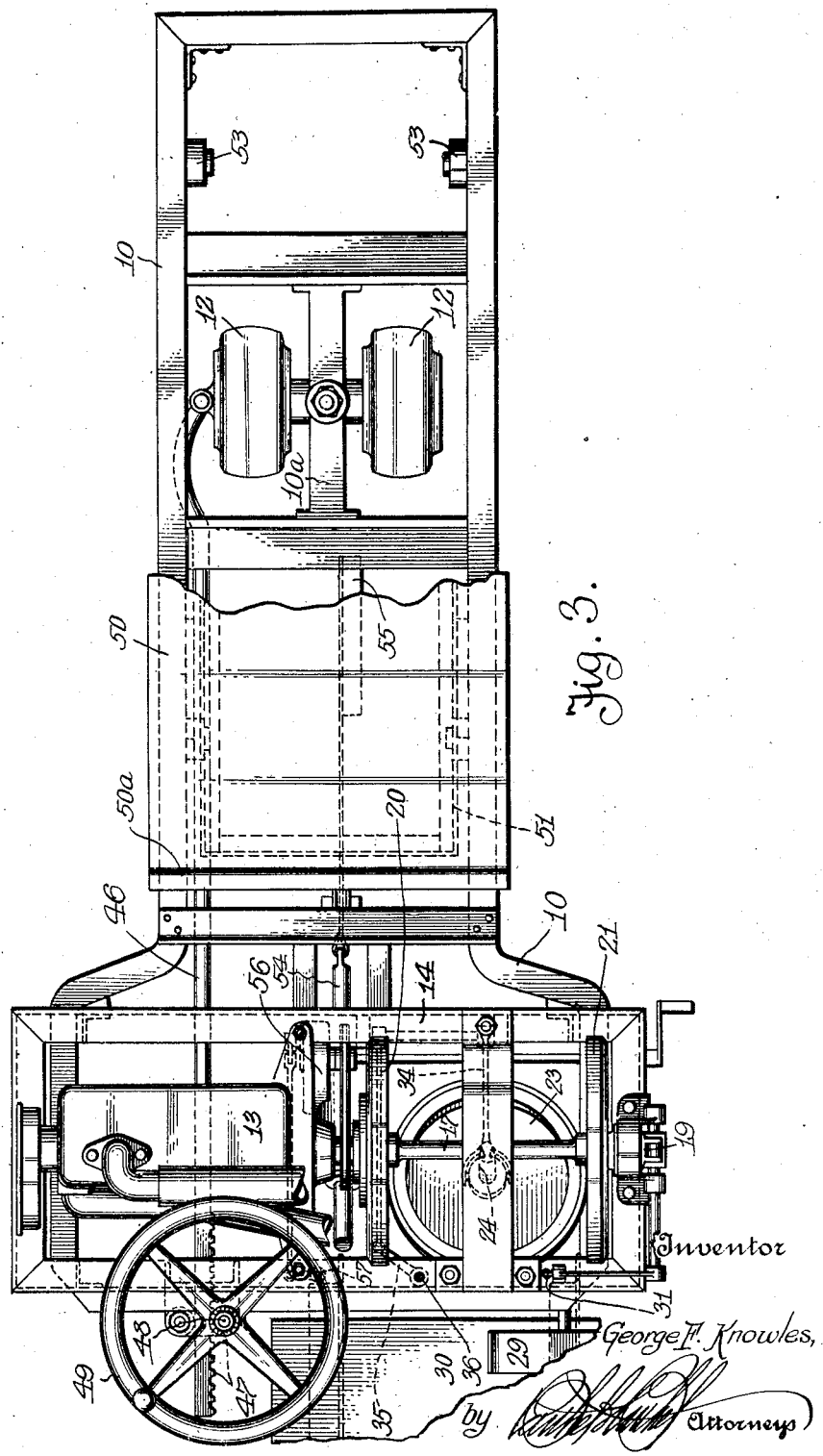

UNITED STATES PATENT OFFICE.

GEORGE F. KNOWLES, OF DETROIT, MICHIGAN, ASSIGNOR TO FEDERAL MOTOR TRUCK COMPANY, OF DETROIT, MICHIGAN, A CORPORATION OF MICHIGAN.

TRUCK.

1,406,462.	Specification of Letters Patent.	Patented Feb. 14, 1922.

Application filed June 30, 1919. Serial No. 307,660.

*To all whom it may concern:*

Be it known that I, GEORGE F. KNOWLES, a citizen of the United States of America, residing at Detroit, in the county of Wayne and State of Michigan, have invented certain new and useful Improvements in Trucks, of which the following is a specification, reference being had therein to the accompanying drawings.

This invention relates to improvements in industrial trucks, pertaining more particularly to structures employing a power plant as a motive power for moving the trucks about.

Owing to the peculiar conditions surrounding the use of industrial trucks, the production of trucks employing a power plant structure as the motive power involves the solution of a number of problems the characteristics of which are inherently due to such conditions, and while trucks for this purpose embody broadly the general elements of trucks used for other purposes, these problems so complicate and limit the selection of elements as to make such selection a problem requiring solution.

For instance, a truck must be capable of traveling throughout practically all portions of industrial plants which it serves; hence, it must be strong and substantial to permit of indoor and outdoor service and the conditions inherent in such plant of traveling over uneven surfaces. It must be comparatively short and narrow in width as well as of comparatively low height, since it must be capable of traveling in narrow spaces, make sharp turns, when necessary, and travel at points where the overhead room is small. The power plant must be capable of moving comparatively heavy loads, since its purpose is to handle work which hand trucks cannot profitably move, loads which cannot be carried by traveling cranes, etc., since the later have a more or less fixed zone of operation, whereas the industrial truck is required to move anywhere. The load carrying portion of the truck must be comparatively close to the surface on which the truck travels, since the purpose of the truck is to eliminate the necessity for raising and lowering any weights for loads, such as would be required in the loading of the ordinary motor truck structure even under conditions where the surroundings would permit the latter to be used; in addition, this low body portion is practically required where the practice of employing a supplemental load carrier is involved, this supplemental carrier being usually a supporting member on to which the load is placed, and when the load is to be moved, the truck is brought into a position where its load carrying portion passes beneath the supplemental carrier; and after which the latter is raised from contact with its supporting surface, thus completing the loading operation.

Owing to these peculiar conditions, the production of power plant operated industrial trucks has been, so far as I am aware, practically limited to those employing electric motors, due to the fact that it is possible to utilize a motor of a sufficient power within the dimensions permitted in the truck size, power plants of other types being more or less inapplicable for use by reason of the inability to install a plant of sufficient power within the limited dimensions permitted. And while such electric power plants have been employed, and are in service at the present time, owing to the inability to provide an efficient substitute for the particular power plants employed, such trucks have a number of disadvantages. For instance, where the current for the motor is supplied by trolley, the field of operations must either be restricted or a maze of trolley wires must be utilized to permit of freedom of movement from one part of the plant to another. To avoid these difficulties, it is the practice to utilize storage batteries but owing to the power requirements, the number of batteries and their size are comparatively large and provide a very material factor in the weight which must be moved by the power plant itself; in addition, the rough usage to which the truck must be placed in passing to the different parts of the plant over uneven surfaces, tends to break down the battery construction and render them unserviceable, to which might be added the necessity for recharging the batteries; if a single set of batteries is employed, the truck becomes useless during the time of re-charging, while where reserve sets are employed, these involve the additional cost of the sets. As a result industrial trucks employing the electric power plants, if designed for roving service, involve not only a higher cost of manufacture as well as operation, but requires an excessive power condition through the necessity for transporting the weights of batteries, etc.; and in this connection the necessity for transporting these battery weights and locating them at points where the load receiving space is not materially restricted while retaining the length of the truck within reasonable limits, adds materially to the cost factor through the necessity for employing a stronger and heavier supporting frame, wheels, etc.

The present invention is designed to overcome these difficulties and to provide an industrial truck which not only exceeds the serviceability of power plant driven trucks as heretofore employed, but in addition will provide this result with a greatly decreased cost of manufacture and maintenance, and provide a structure which is of greatly decreased weight, thus materially increasing the percentage of power applicable in transporting the temporary load.

This result is brought about by the discovery that it is possible to mount a power plant of the internal combustion type, and provide the necessary connections between the plant and the drive mechanism, all within the space or dimensions permitted under industrial truck practice. This is made possible through the particular manner in which the power plant is mounted and the ability to use certain forms of connections between the power plant and the drive structure so as to produce a sufficiently compact arrangement of the whole as to fall within the dimensions permitted for serviceability. This result is obtained without sacrificing power or decreasing the load carrying capacity of the body portion, since the relatively low weight factor of the power plant of this type as compared to that of the electric types, with its batteries, so decreases the weight to be carried as to produce the result.

To these and other ends, therefore, the nature of which will be readily understood as the invention is hereinafter disclosed, said invention consists in the improved combination and construction of parts hereinafter fully described, illustrated in the accompanying drawings, and more particularly pointed out in the appended claims.

In the accompanying drawings, in which similar reference characters indicate similar parts, in each of the views, Figure 1 is a perspective view showing one embodiment of the present invention;

Fig. 1ª is a perspective view showing a non-traveling load carrier of a type adapted to be used in connection with the truck of Fig. 1;

Fig. 2 is a vertical longitudinal sectional view taken through the truck of Fig. 1, the view showing two positions of the temporary load carrier;

Fig. 3 is a top plan view of the truck of Fig. 1, parts being broken away;

Fig. 5 is a sectional view on an enlarged scale taken through a portion of the connections between the power plant and the truck drive wheels;

Fig. 6 is a detail view showing parts disclosed in Fig. 5, the view being taken approximately on line 6—6 of Fig. 5;

For the purposes of explanation, the power plant section is indicated at A and the loading section at B, these two sections being supported by a frame 10, the contour of which is shown more particularly in Fig. 3, being built up of suitable angle iron members with proper cross braces in order to produce a strong and substantial frame for the purpose. As shown in Fig. 3, the forward end—power plant section—is increased in width over that of the loading section, such increase, however, still maintaining the truck within the normal dimensions permitted. It will be understood however, that, if desired the width of the loading section may be correspondingly increased, although such increase is not necessary, since the actual load is generally carried by a supplementary carrier which may have such width, the width of the frame shown being sufficient to provide the necessary support for the supplementary carrier C, shown more particularly in Fig. 1ª.

Frame 10 is supported on drive wheels 11, located beneath the power plant section, and wheels 12, located beneath the loading section and which, as presently pointed out form the steering wheels for the truck.

Figure 4:
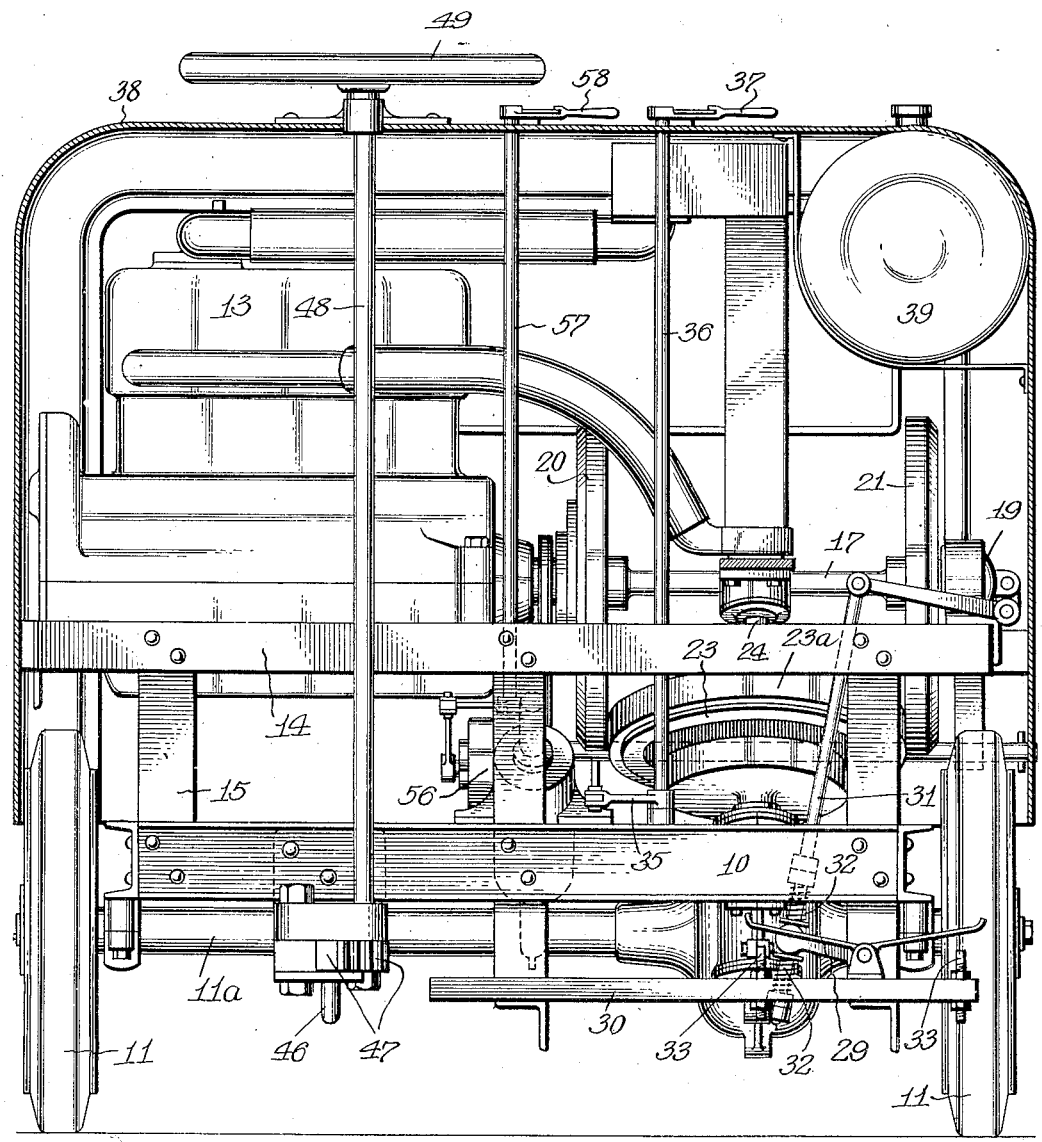
Fig. 4 is a front elevation with parts omitted to illustrate the interior construction of the power plant section of the truck.

Drive wheels 11 are mounted on a drive axle, Fig. 4 showing an axle casing 11ª within which the drive shaft or axle is located, the particular form shown being that of a direct drive to the wheels 11. It will be understood, of course, that any particular or preferred form of wheel mounting may be employed, the direct connection between axle and wheel being made possible by the fact that the steering is provided by wheels 12.

13 indicates the power plant shown as in the form of an internal combustion motor of suitable design and which is supported on the upper frame 14 itself held in proper spaced relation with frame 10 by suitable supports shown as vertically extending member 15.

The motor 13 is shown as having its crank shaft (not specifically illustrated) as extending transversely of the direction of length of the truck, the drive shaft—shown as an extension of the crank shaft—being indicated at 16.

Figure 7:
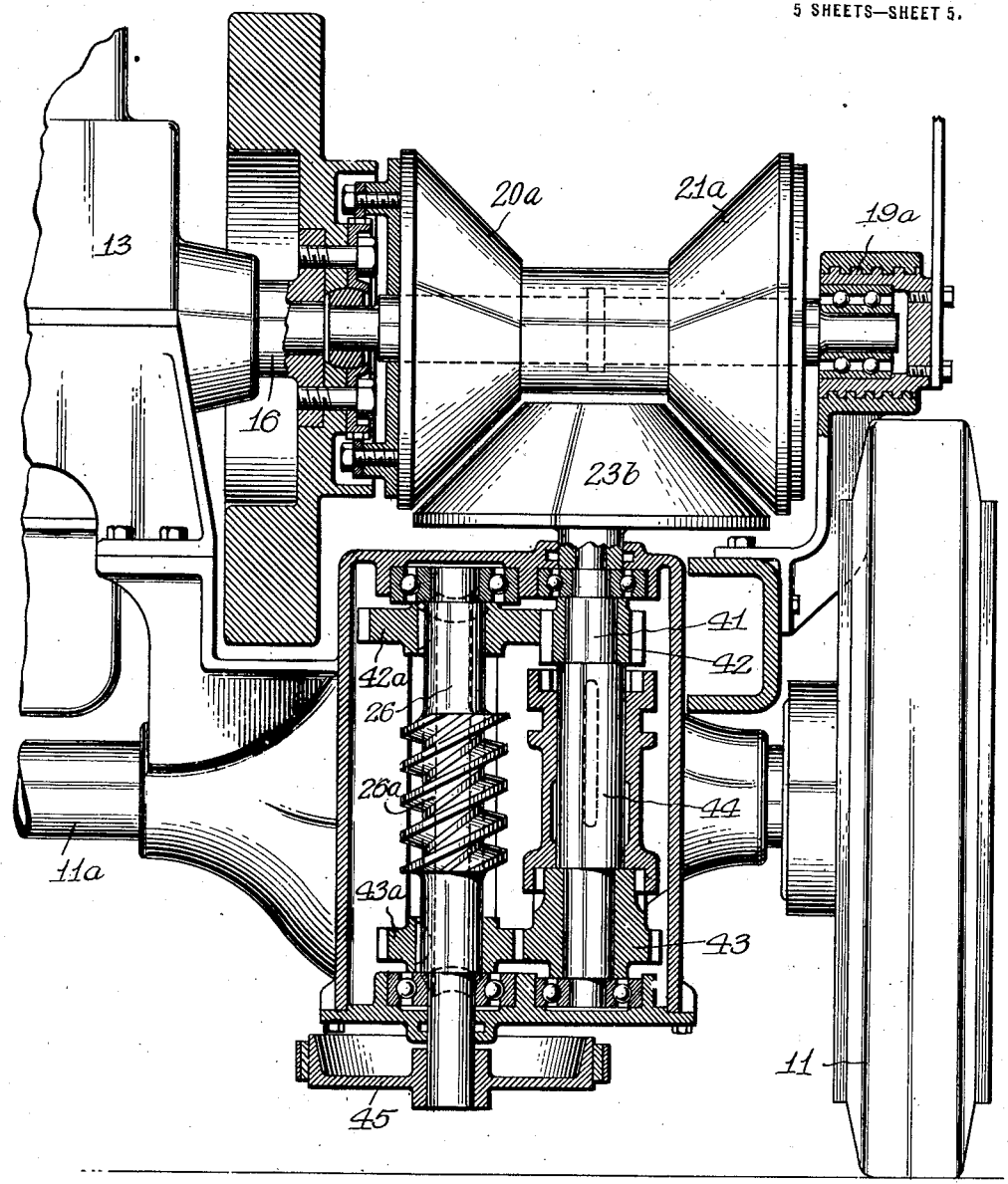
Fig. 7 is a vertical sectional view with parts in elevation and parts omitted, taken through the connections between the power plant and the drive wheels of a modified form of construction.

Two forms of connections between the motor and the drive axle are shown in Figs. 5 and 7, a preferred arrangement being that shown in Fig. 5 where it is desirous to provide for great flexibility in connection with speed requirements, the arrangement shown in Fig. 7 being designed more particularly as a two-speed construction. It will be understood, of course, that in view of the comparatively high speed of the motor, and the low speed requirements of an industrial truck, the operating connections between the motor and drive axle practically require the presence of a worm drive element or unit. In the present disclosure, both forms of connections carry such unit and the arrangement is such as to permit of equal speed possibility in both forward and reverse directions of drive.

Referring first to the form of connections shown in Fig. 5, 17 indicates an extension of drive shaft 16, the latter having an axially extending recess 16ª into which one end of shaft 17 extends, the opposite end of shaft 17 being carried in a bearing 18 forming part of a shiftable element 19 supported in a portion of the frame, elements 18 and 19 forming a unit by means of which shaft 17 may be moved in the direction of its length without disengagement from the drive shaft 16, the particular form shown permitting of a sliding movement in an axial direction of a ball member carried by the shaft 17 within the recess 16ª.

20 and 21 designate two disks secured on shaft 17 at spaced apart points, these disk elements forming part of a friction drive structure. Disk 20 is utilized to connect shafts 16 and 17 through a suitable flexible coupling fixture or unit of a well known type, such for instance as is indicated at 22, in Fig. 6, 22ª indicating a suitable flexible member to which the disk 20 and shaft 16 are connected; this is one type which may be employed, it being readily understood that other forms, capable of producing a direct drive between shaft 16 and disk 20 while permitting the disk 20 to shift axially, may be employed.

The friction drive unit is completed by a third rotatable element or member 23 mounted between the disks 20 and 21, this element being shown as having an annular fiber section member 23ª carried by member 23, the latter being mounted on a shaft 24, the upper end of which is carried in a suitable bearing support 24 mounted fixedly to the frame, and which, in the present instance is shown as surrounding shaft 17 but free from contact therewith; shaft 17 is free to move within the bearing without affecting the position of shaft 24. Member 23 is splined or otherwise secured on shaft 24 to permit movement of the member lengthwise of said shaft while maintaining a positive drive connection therebetween. The opposite end of shaft 24 carries a flexible coupling of the type shown in Fig. 6 and which is connected to a worm shaft mounted in suitable bearings carried by the frame.

The worm shaft 26 carries a worm 26ª adapted to cooperate with a worm gear carried by or operatively connected with the drive axle, the worm gear being indicated at 27, and the drive axle at 28.

As will be understood, if shaft 17 be shifted in the direction of its length in either direction from the position shown in Fig. 5, one of the disks 20 or 21 will be brought into frictional engagement with member 23ª and since shaft 17 is constantly driven from shaft 16, the engagement of disk 20 or 21 with member 23ª will cause member 23 to be rotated and thus drive worm 26 and drive axle 28, the direction of rotation of member 23 depending upon which disk is brought into contact with it, while the speed of rotation of the worm will be dependent upon the position of member 23 with respect to the axis of members 20 or 21.

The selective engagement of the disks 20 or 21 with member 23 is brought about by the shifting of shaft 17 through the movement of the unit formed by the members 18 and 19. The movement of this unit is controlled from a foot lever 29 mounted on a platform 30, suitable rock shaft and lever connections being provided to transmit the longitudinal movement of a connecting member 31 to the unit formed of members 18 and 19, the various connections translating this movement in the proper direction and to the desired degree. In order that efficient action may be provided, operating connection 31 is connected to lever 29 by a yieldable connection shown as in the form of resilient members 32 on opposite sides of one arm of lever 29, members 32 being of a definite power so that when the lever is moved in either direction, the normal resistance of the spring members 32 will cause shaft 17 to shift in the proper direction and bring one of the disks into engagement with member 23 with sufficient frictional contact to provide for proper operation, any excessive pressure applied on the lever being compensated by the yielding of the spring member which is active. As lever 29 is shown as provided with arms on opposite sides of its pivot, it will be understood that upon depression of either end of the lever, by the foot of the operator, the connection 31 will be moved in one direction or the other and thus control the movement of shaft 17.

In order to prevent excessive pressure of a disk or member 23, I prefer to employ adjustable stops, 33, located in the path of travel of the ends of lever 29, thus limiting the length of movement of the foot lever and thereby take from the operator any possibility of placing a sufficient pressure upon the engaging disk, to squash the fiber or damage it, and at the same time eliminate any necessity for the operator concentrating his attention upon this lever in order to provide the proper action and prevent slip between the engaged members.

As will be understood, this particular arrangement of control is but one form in which this result can be obtained, and I do not limit myself to such preferred arrangement, other ways being possible, one of which is disclosed in Fig. 7.

As heretofore indicated the speed is controlled by shifting of member 23 in the direction of its axis, and this may be provided in any desired manner, the drawings showing the use of a lever 34 having its free end forked and engaging the hub of member 23, lever 34 being moved through suitable connection with a crank arm 35 carried by rod 36 extending upwardly and terminating with a handle 37 located at a convenient point for the operator, this being shown as mounted on the top of a casing 38 which encloses a major portion of the operating mechanism.

As will be understood, shifting of handles 37 serves to move lever 34 in a manner to shift member 23 in the direction of its axis, thus shifting the point of contact between member 23 and a disk thus rendering the friction drive unit operative to produce any desired speed within the limits of the power plant.

As will be seen, the axis of member 23 extends at an angle to the vertical, thus locating the connections as extending more or less in vertical plane instead of horizontal plane as in the usual type of connections in motor vehicles. This general arrangement permits of the location of the complete power plant section within the small dimensions generally permitted, the crank shaft of the motor thus being permitted to be located substantially in a vertical plane extending through the drive axle, and permitting of a sufficiently close location of the friction drive structure to the end of the motor as will permit the entire power plant to be located within the transverse dimension of the truck. As will be understood, this permits of the use of a motor of sufficient power to transport all loads, which the truck is designed to carry and yet locate the entire structure in such compact form as will enable the truck to meet all the conditions of service as to flexibility of movement, variations in speed, etc., required of industrial truck operations.

And while the location of the power plant and connections is confined within the dimensions indicated, with the drive axle located close to the surface on which the truck is moved and the sizes of structure substantially fill the space permitted to meet the general conditions, so that it is not possible to interpose a spring support for the power plant, it will be readily understood that no material damage will ensue from the effects of jolting, etc. due to the fact that a flexible coupling is interposed in the length of the vertical member which might form the means for communicating the effect of such jarring or jolting action, enables the structure to be utilized under various conditions, these flexible couplings being located between the parts supported by the upper frame member and those supported by the lower frame member. As a result, the truck can operate under the usual severe plant conditions without liability of disturbing the general operative connections of the structure of the motor itself, even though the usual supporting springs deemed necessary are omitted.

A fuel tank, indicated at 39, is located at a suitable point beneath the casing, and a suitable throttle control, indicated at 40 in Fig. 1, may be employed for controlling the speed of the motor. The exhaust may be led to any desired point, and if desired, a suitable starting structure may be employed, the drawings showing the use of an ordinary hand crank, adapted to be connected to an element which is in direct drive connection with the crank shaft. As shown, the radiator may be located at a side of the truck, thus providing for efficient cooling operation.

In Fig. 7, I have shown a modified form of connection disks 20 and 21 and the members 23 being substituted by cones 20ª, 21ª and 23ᵇ, the cones 20ª and 21ª being shiftable axially as a unit by the action of the threaded shifting member 19ª of a well known type of construction, the connection between the cone 20ª and the drive shaft 16 being of suitable type, such for instance as indicated in Fig. 6 or a gear or spline connection of suitable design as indicated in Fig. 7.

In this particular form 23ᵇ is not moved axially, being mounted on a shaft 41 which carries the gears 42 and 43 of a change speed structure, said gears meshing with complemental gears 42ª and 43ª on the worm shaft 26. Selection as to drive as between gears 42 and 43 is by means of a shiftable coupling member 44 mounted on shaft 41 and having a suitable operating mechanism not shown, but which may be of the type employed in shifting the member 23 of the preferred construction. Worm 26ª is operatively connected to worm wheel 27 as in the other structure, thus providing a two speed transmission between the motor and the drive axle in which selective means are provided for permitting drive in either direction at will, the range of speeds being the same in both the forward and reverse direction.

While the transmission type shown in Fig. 7 offers less flexibility as to speed variations while maintaining motor speed constant, it is of a serviceable character by reason of the fact that it is possible to vary the speed of the motor by the use of the throttle control mechanism, thus meeting the general requirements.

As will be understood, suitable means may be provided for a brake action, Fig. 5 indicating the use of the usual brake band formation in connection with the unit 22, the specific arrangement not being disclosed since it is of any of the well known types while Fig. 7 discloses the use of a brake drum 45 on the end of the worm shaft, this drum being operative in connection with a brake band of usual type.

Frame 10 extends rearwardly from the power plant section and is supported by the wheels 12 which are spaced apart a distance sufficient to locate them on opposite sides, of the longitudinal center of the frame but insufficient to bring them to the sides of the frame, the wheels being mounted on a suitable axle support connected to a member 10ª of the frame on the longitudinal center line of the truck.

As heretofore pointed out, wheels 12 operate as the steering wheels of the truck, and steering action is had by connecting a rod 46 to one end of the wheel axle and employing a suitable mechanism for shifting the rod substantially in the direction of its length, the particular means shown being in the form of a rack and pinion structure 47, the rack teeth being carried by the rod and the pinion by a vertically extending rod 48 to which is secured the steering wheel 49.

As will be understood, shifting of the steering wheel 49 serves to shift rod 46 and swing the pair of wheels 12 on the pivot connection. Since the wheels are spaced a relatively small distance apart, the truck is able to be steered in a short radius, enabling it to meet the onerous conditions of service where it becomes necessary to make short and sharp turns in traveling about the plant.

The loading section of the truck is completed by any preferred form of load carrying member or unit, but I prefer to employ a unit of the general type illustrated in the drawings, in which 50 indicates a flat plate-like member having its advance edge preferably turned upward, as at 50ª, this plate being mounted on a suitable frame 51 carrying cross bars if desired, and which normally will rest upon frame 10, thus locating the plate 50 in a plane sufficiently low as to readily enter beneath a supplemental load carrier such as indicated, for instance, in Fig. 1ª.

Since it is essential, that, for transportation purposes, such supplemental carrier be raised off of the supporting surface on which it rests when in stationary position I preferably so arrange the structure as to permit the plate to be raised.

This result can be obtained in any suitable manner, but I prefer to employ a structure of the type shown in Fig. 2, in which 52 indicates a member extending downwardly from frame 51 and which is provided with an inclined edge or face 52ª adapted to cooperate with a roll 53 carried by frame 10, this particular arrangement being duplicated at the desired points, the drawings illustrating the use of four of such structures, two being located on each side of the frame 10 and with one of the pair located in advance of the steering wheels, the other of the pair being located in rear of such wheels.

As will be understood, if the load carrying plate unit be drawn forwardly, as for instance to the dotted line position in Fig. 2, members 52 will ride over rolls 53 and thus raise the platform or plates to an elevated position, so that if the supplemental carrier D be in position on the plate, it will be raised out of contact with the supporting surface on which it rests when not on the truck.

This advancing and raising movement of the plate 50 may, of course, be provided manually, but I prefer to employ the power structure for the purpose, this being shown in the form of a suitable hydraulic control structure of suitable type, no particular or specific disclosure being presented, since any of the well known hydraulic or oil piston or plunger structures may be employed, the drawings indicating the stem 54 of a piston as having a connection with an arm 55 extending downwardly from the plate 50, the stem extending into a chamber into which oil is driven by the operation of a pump 56 of suitable type, the pump being adapted to be driven through a chain connection with the drive shaft of the motor, so that when the pump is placed into active operation the stem 54 will be moved in an advance direction in Fig. 2 and thus draw upon member 55 to attempt to advance plate 50, the presence of face 52ª obviously causing the plates to be gradually raised or elevated as the advancing movement takes place. The pump structure will be connected with the drive shaft preferably by a suitable clutch or coupling arrangement which will permit the pump to be operated at will, so that the pump operation need be present only when desired although the motor may be operating at proper times.

Since no specific structure of pump or hydraulic structure is being claimed herein, detailed disclosure of the structure is omitted any unit of the well known structures being capable of being utilized in the compact arrangement disclosed herein.

As will be understood when the truck is traveling light or has its load placed directly upon the plate or platform 50, there is no necessity for the platform being raised; under such conditions the elevating power device is retained inactive. When conditions are such as to make it necessary to elevate the platform, as when operating in connection with the supplementary load carrier, the elevating power device is made active and the platform drawn forward. Any suitable means for controlling the activity of the elevating device 56 may be employed, that shown being in the form of a vertically extending rod 57 having its upper end provided with a handle 58 above casing 38 and having its lower end arranged to provide for the desired coupling action of the pump with the chain drive connection to the motor.

From the above description and disclosure, it will be readily understood that I have provided a truck adapted to meet the particular problems which are presented in industrial truck operation, and at the same time have produced a construction which is less costly in production, of less weight, less likely to become damaged or rendered useless; which has all of the flexibility of operating conditions possessed by a power plant of the internal combustion type, and which can be maintained in service continuously with greater efficiency and durability than is possible with the power plant industrial trucks in commercial use.

While I have herein shown and described one or more ways in which the invention can be carried into effect, it will be readily understood that the embodiments shown are more or less illustrative and capable of being varied, or changed or modified to meet the different exigencies of use and of the character of service required, and I desire to be understood as reserving the right to make any and all such changes or modifications as may be found desirable or essential in so far as the same may fall within the spirit and scope of the invention, as expressed in the accompanying claims when broadly construed.

Having thus described my invention, what I claim as new is:

1. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels and forming a support for the power plant and loading sections with the power plant section in advance of the loading section, and means for driving the truck, said means including a power plant of the internal combustion motor type, and means for operatively connecting such plant with the drive wheels at will, the arrangement being such that the loading section will be located wholly in rear of the crank shaft of the motor.

2. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels with the power plant section supported by the drive wheels, and means for driving the truck, said means including a power plant of the internal combustion motor type, and means for operatively connecting such plant with the drive wheels at will, said means being located in the power plant section.

3. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels with the power plant section supported by the drive wheels, and means for driving the truck, said means including a power plant of the internal combustion motor type having its crank shaft axis extending substantially parallel with the drive wheel axis, and means for operatively connecting such plant with the drive wheels at will.

4. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels with the power plant section supported by the drive wheels, and means for driving the truck, said means including a power plant of the internal combustion motor type having its crank shaft axis extending substantially parallel with and in approximately the vertical plane of the drive wheel axis, and means for operatively connecting such plant with the drive wheels at will.

5. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such crank shaft with the drive wheels at will.

6. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such crank shaft with the drive wheels at will, said connecting means including a shaft alined with the crank shaft axis and in constant drive relation to the crank shaft, said shaft being shiftable in the direction of its length at will.

7. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such crank shaft with the drive wheels at will, said connecting means including a shaft alined with the crank shaft axis and in constant drive relation to the crank shaft, said shaft carrying a pair of spaced-apart elements rotatable therewith, and means whereby either element may be made active as a drive element in the connecting means at will.

8. A truck of the type of claim 7 characterized in that the element activity is provided by shifting of the shaft in the direction of its length.

9. A truck of the type of claim 7 characterized in that the element activity is provided by shifting of the shaft in the direction of its length through means made operative at the outer end of the shaft.

10. A truck of the type of claim 6 characterized in that the connection between the shiftable shaft and the crank shaft includes an element secured to the shiftable shaft, an element movable with the crank shaft, and drive means permanently connecting said elements to permit variation in distance between the elements.

11. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such crank shaft with the drive wheels at will, said connecting means including a shaft alined with the crank shaft axis and in constant drive relation to the crank shaft, and means for shifting said shaft in the direction of its length at will, said latter means including a shiftable element mounted at the outer end of the shaft being shifted.

12. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type, and mechanism for operatively connecting such plant with the drive wheels at will, said mechanism including reversing means, and means for driving the wheels at similar speeds during forward and reverse travel.

13. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type, and means for operatively connecting such plant with the drive wheels at will, said connecting means including a shiftable unit operative to make and break the connections and to selectively control the direction of travel of the truck.

14. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such plant with the drive wheels at will, said connecting means including a shiftable unit having its axis in approximate alinement with the crank shaft axis, and a driven shaft having its direction of length extending at substantial right angles to the shiftable unit axis and in advance of the load section.

15. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type, having its crank shaft axis extending substantially parallel with the drive wheel axis, and means for operatively connecting such plant with the drive wheels at will, said connecting means including a shiftable unit having its axis in approximate alinement with the crank shaft axis, and a driven shaft having its direction of length extending at substantial right angles to the unit axis and having its axis intersecting the unit axis intermediate the ends of the unit, the shiftable unit comprising a shaft shiftable in the direction of its length, and a pair of elements secured thereto on opposite sides of and spaced from the point of axes' intersection.

16. A truck of the type of claim 14 characterized in that the shiftable unit includes a shaft shiftable in the direction of its length and carrying a pair of spaced apart elements, with the driven shaft carrying an element lying between and adapted to be selectively engaged with either unit element by the unit shifting movements.

17. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type. having its crank shaft axis extending substantially parallel with the drive wheel axis and means for connecting such plant with the drive wheels at will, said means including a shiftable unit having its axis in approximate alinement with the crank-shaft axis, and operating connections between the unit and the drive wheels and including a worm drive having the worm axis extending transverse to the unit axis.

18. A truck of the type of claim 17 characterized in that the worm gear of the worm drive has its axis alined with the drive wheel axis.

19. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels, and means for driving the truck, said means including a power plant of the internal combustion motor type having its crank shaft axis extending substantially parallel with the drive wheel axis, and means for operatively connecting such plant with the drive wheels at will, said connecting means including change speed mechanism having a shiftable element positioned below a horizontal plane extending through the crank shaft axis.

20. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type having its crank shaft axis extending substantially parallel with the drive wheel axis, and means for operatively connecting such crank shaft with the drive wheels at will, said connecting means including change speed mechanism, a shiftable unit having its axis in alinement with the crank shaft axis, and a shiftable element forming part of the change speed mechanism with its axis intersecting the axis of such shiftable unit at substantial right angles.

21. A truck of the type of claim 20 characterized in that the shiftable element is located below a horizontal plane intersecting the axis of the unit and the element axis point of intersection is located intermediate the ends of the unit.

22. In industrial trucks adapted for service under the space restriction conditions of industrial plants, a wheeled unit having power plant and loading sections with the load-receiving surface of the loading section extending substantially parallel and in proximity to the surface on which the truck travels to permit loading and unloading of the truck, said unit including a frame having drive and steering wheels, and means for driving the truck, said means including a power plant of the internal combustion motor type, and means for operatively connecting such plant with the drive wheels at will, said connecting means including mechanism for varying the speed of travel of the truck independent of variation in speed of the motor.

23. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant of the internal combustion motor type, and means for operatively connecting the power plant with the drive wheels at will, said connecting means including mechanism for varying the speed of travel of the truck independent of variation in speed of the motor, said mechanism including a change speed unit operatively interposed between the motor crank shaft and the drive wheels with a driven element of the unit extending in a direction transverse to the direction of the crank shaft axis.

24. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels with the power plant section supported by the drive wheels, and means within the power plant section for driving the truck, said means including a power plant of the internal combustion motor type, and means for operatively connecting the crank shaft of the motor with the drive wheels at will, said connecting means including a change speed unit having an element extending in a direction transverse to the direction of the crank shaft axis.

25. A truck of the type of claim 24 characterized in that the connecting means also includes a shaft in substantial axial alinement with the crank shaft axis and shiftable in the direction of its length, said shaft being in constant drive relation with the crank shaft.

26. A truck of the type of claim 24 characterized in that the connecting means also includes a shaft in substantial axial alinement with the crank shaft axis and is shiftable in the direction of its length.

27. A truck of the type of claim 24 characterized in that the crank shaft axis of the motor extends in substantial parallelism with the drive wheel axis, and that the connecting means includes a shaft extending in substantial alinement with the crank shaft axis and is shiftable in the direction of its length.

28. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant, and means for operatively connecting such plant with the drive wheels at will, said connecting means including a shiftable unit operative to make and break the connections and to selectively control the direction of travel of the truck, and means for rendering said unit active at will, said latter means including a lever, and connections between said lever and the unit to permit lost-motion movement between the lever and connections within predetermined limits.

29. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame having drive and steering wheels, and means for driving the truck, said means including a power plant, and means for operatively connecting such plant with the drive wheels at will, said connecting means including a shiftable unit operative to make and break the connections and to selectively control the direction of travel of the truck, and mechanism for rendering such unit active at will, said mechanism including a lever, and connections between the lever and unit to permit lost motion action between the lever and connections within adjustable limits.

30. A truck of the type of claim 28 characterized in that the lever and connections of the mechanism are operatively connected by yieldable elements carried by the connections operative to retain a normal position of the lever, adjustable stops being located in the path of travel of the lever and positioned to become active on the lever when lever movement has affected an element in the direction of its yield.

31. In industrial trucks adapted for service under the space restriction conditions of industrial plants, a wheeled unit having power plant and loading sections with the load-receiving surface of the loading section extending substantially parallel and in proximity to the surface on which the truck travels to permit ready loading and unloading of the truck, said unit including a frame adapted to support the power plant and loading sections of the truck and having drive and steering wheels with the power plant section supported by the drive wheels, means in the power plant section for driving the truck, means for supporting the steering wheels in said frame beneath and intermediate the ends of the loading section, said steering wheels and the supporting means therefor forming a steering unit shiftable bodily on a vertical axis, a hand steering element located in a plane above the power plant, and operative connections between said element and said unit for translating the hand steering movements of the element into steering movements of the steering unit, said connections including a rack and pinion formation, said steering unit including an element of less length than the transverse width of the truck frame with the unit axis located substantially midway of the element length, the ends of the element carrying the steering wheels, the operating connections including also a rod member having a pivotal connection with one end of said element outside the steering wheel mounted on such end, with the rod connected to said rack.

32. In industrial trucks wherein the power plant and loading sections are supported by a frame having drive and steering wheels with the power plant section carrying means including a motor for driving the truck, a load carrier positioned on the loading section of the frame and movable relatively thereto to vary the distance between the load-receiving plane of the carrier and the surface on which the truck travels while maintaining the frame distance constant, and means for operatively connecting the carrier with the motor at will to provide such carrier movements, the connections of the carrier and motor including a power-operated unit adapted to be operatively connected with the power plant motor at will, and flexible connections between the unit and carrier.

33. A truck of the type of claim 32 characterized in that the power-operated unit includes fluid-operated means located within the power plant section, said means being adapted to be operatively connected to the power plant motor at will.

34. A truck of the type of claim 32 characterized in that the power-operated unit includes a piston and cylinder unit with the piston directly connected within the connections, and means operatively connectible with the power plant motor at will for operating said piston.

35. A truck of the type of claim 32 characterized in that the power-operated unit includes a piston and cylinder unit with the piston directly connected within such connections, and means adapted to be operatively connected with the motor at will for applying fluid pressure to one side of said piston.

In testimony whereof I affix my signature in the presence of two witnesses.

GEORGE F. KNOWLES.

Witnesses:
ANNA M. DORR,
HORACE G. SEITZ.